US012696837B2

(12) United States Patent
Park et al.

(10) Patent No.: US 12,696,837 B2
(45) Date of Patent: Aug. 4, 2026

(54) RIDING-TYPE MOWING APPARATUS INCLUDING HEIGHT ADJUSTMENT PART OF MOWER UNIT

(71) Applicant: DAEDONG MOBILITY CORP., Anseong-si (KR)

(72) Inventors: Sang Ji Park, Jeonju-si (KR); Min Kyu Sun, Daegu (KR)

(73) Assignee: DAEDONG MOBILITY CORP., Anseong-si (KR)

( * ) Notice: Subject to any disclaimer, the term of this patent is extended or adjusted under 35 U.S.C. 154(b) by 366 days.

(21) Appl. No.: 18/372,672

(22) Filed: Sep. 25, 2023

(65) Prior Publication Data

US 2024/0415054 A1     Dec. 19, 2024

(30) Foreign Application Priority Data

Jun. 15, 2023     (KR) ........................ 10-2023-0076649

(51) Int. Cl.
| | |
|---|---|
| *A01D 34/64* | (2006.01) |
| *A01D 34/74* | (2006.01) |
| *A01D 69/10* | (2006.01) |
| *A01D 101/00* | (2006.01) |

(52) U.S. Cl.
CPC ............. *A01D 34/74* (2013.01); *A01D 34/64* (2013.01); *A01D 2101/00* (2013.01)

(58) Field of Classification Search
CPC ...... A01D 34/00–34/905; A01D 69/10; A01D 2101/00
See application file for complete search history.

(56) References Cited

U.S. PATENT DOCUMENTS

| | | | | |
|---|---|---|---|---|
| 6,837,032 | B1 * | 1/2005 | Swartzendruber ..... | A01D 34/64 56/14.9 |
| 7,051,499 | B2 * | 5/2006 | Goto .................... | A01D 34/661 56/14.9 |
| 7,059,109 | B2 * | 6/2006 | Samejima .............. | A01D 34/64 56/17.1 |
| 7,434,379 | B2 * | 10/2008 | Nogami ................. | A01D 34/74 56/17.1 |
| 10,645,873 | B2 * | 5/2020 | Reichard .............. | A01D 34/824 |
| 11,006,574 | B1 * | 5/2021 | Nichols .................. | A01D 34/74 |
| 11,310,961 | B2 * | 4/2022 | Clontz ................. | A01D 34/661 |
| 2004/0154274 | A1 * | 8/2004 | Samejima ........... | A01D 34/662 56/1 |

(Continued)

*Primary Examiner* — Tara Schimpf
*Assistant Examiner* — Madeline I Runco
(74) *Attorney, Agent, or Firm* — Revolution IP, PLLC

(57) ABSTRACT

A riding-type mowing apparatus includes: a lower limit adjustment lever provided at a position where a user reaches the position by extending an arm of the user; a lever connection bar coupled to a lower portion of the lower limit adjustment lever and extending in a linear shape; a lower limit adjustment step rotating together with the lever connection bar and adjusting a lift-down height of the mower unit; a first front deck link coupled to a front upper surface of the mower unit; a second front deck link coupled to the first front deck link and the body frame; a first rear deck link coupled to a rear upper surface of the mower unit; a second rear deck link coupled to the first rear deck link and the body frame; and a protruding latch part making contact with a lower surface of the lower limit adjustment step.

4 Claims, 9 Drawing Sheets

(56) References Cited

U.S. PATENT DOCUMENTS

| 2007/0271895 | A1* | 11/2007 | Nogami | A01D 34/74 |
| | | | | 56/17.1 |
| 2008/0190087 | A1* | 8/2008 | Elhardt | A01D 34/74 |
| | | | | 56/17.1 |
| 2015/0121832 | A1* | 5/2015 | Nier | A01D 34/006 |
| | | | | 56/320.1 |
| 2015/0296711 | A1* | 10/2015 | Haun | A01B 63/12 |
| | | | | 56/10.1 |
| 2019/0387676 | A1* | 12/2019 | Welz | A01D 34/82 |
| 2025/0169396 | A1* | 5/2025 | Southwell | G05G 5/03 |

* cited by examiner 341a          341b  323  321          322

340          320

RIDING-TYPE MOWING APPARATUS INCLUDING HEIGHT ADJUSTMENT PART OF MOWER UNIT

BACKGROUND OF THE INVENTION

1. Field of the Invention

The present invention relates to a riding-type mowing apparatus, and more specifically, to an apparatus including a part capable of adjusting a lower limit height of a mower unit including a blade.

2. Description of the Related Art

In general, a mower is an apparatus for cutting vegetation such as grain, grass, and miscellaneous trees, and various types of mower have been developed and used depending on the purpose of use and a shape. In modern times, a mower in the form of a working machine, which is attached to the agricultural machine, has been developed and used because of realization of the mechanization of agricultural machines. However, as the effective value decreases, a riding-type weeding apparatus equipped with an engine capable of performing specialized weeding work has been developed and used in recent years.

FIG. 1 illustrates a riding-type mowing apparatus that is a mowing apparatus manufactured as a working vehicle capable of riding a person, in which the mowing apparatus includes two front wheels 1 and two rear wheels 2, a body frame 10 is provided on the front wheels 1 and the rear wheels 2, the body frame 10 is provided with a chair-type driver seat 11 on which a user may sit and a protective structure (roll over protection system (ROPS)) 12, and levers 14 and 15, which are manipulated with user's hands and may control movement of a zero-mower, are provided in front of the driver seat 11. When the user manipulates the levers, the vehicle moves forward and backward and turns left and right, and a mower unit 3 provided between the front wheels and the rear wheels is lifted up and down.

The mower unit 3 is coupled to the body frame 10 between the front wheels 1 and the rear wheels 2, and includes a deck body 3a equipped with a blade, and a front deck link 13 and a rear deck link configured to lift-up and lift-down the deck body 3a, respectively.

The deck body 3a is lifted down or up through the operation of the front deck link 13 and the rear deck link, and when the deck body 3a is lifted down, grass or vegetation may be mowed below the deck body 3a, so that it is possible to smoothly move the vehicle in a state where the deck body 3a is lifted up.

In case of such a riding-type mowing apparatus, the mower unit including a blade moves up and down, the user needs to directly set a position when the mower unit is lifted down.

That is, if the user may adjust the position when the mower unit lifted down to the bottom, it is possible to perform a more appropriate lawn mowing by adjusting a lower limit position according to a state of the lawn or a curvature of the ground.

SUMMARY OF THE INVENTION

The present invention proposes an apparatus that enables a user to directly adjust a lower limit height of a mower unit, and more specifically, proposes an apparatus that facilitates maintenance because a lower limit adjustment part has a simple structure.

A riding-type mowing apparatus according to an embodiment in which a mower unit is disposed below a body frame to mow grass through a blade mounted in the mower unit and a driver seat is provided on the body frame, in which the riding-type mowing apparatus includes: a lower limit adjustment lever provided at a position in which a user sitting in the driver seat is able to reach the position by extending an arm of the user; a lever connection bar coupled to a lower portion of the lower limit adjustment lever and extending in a linear shape; a lower limit adjustment step configured to rotate together with the lever connection bar and to adjust a lift-down height of the mower unit using the lower limit adjustment lever when the mower unit is lifted down toward a ground; a first front deck link coupled to a front upper surface of the mower unit; a second front deck link coupled to the first front deck link and the body frame; a first rear deck link coupled to a rear upper surface of the mower unit; a second rear deck link coupled to the first rear deck link and the body frame; and a protruding latch part formed at an end portion side of the second rear deck link to have a shape protruding upward with a predetermined thickness, and configured to make contact with a lower surface of the lower limit adjustment step when the mower unit is lifted down.

According to the riding-type mowing apparatus of the proposed embodiment, the user may easily manipulate the lower height of the mower unit, and connection between components for adjusting the lower height is simplified, so that maintenance thereof may be easy.

DETAILED DESCRIPTION OF THE INVENTION

Hereinafter, embodiments of the present invention will be described with reference to the drawings.

Figure 1:
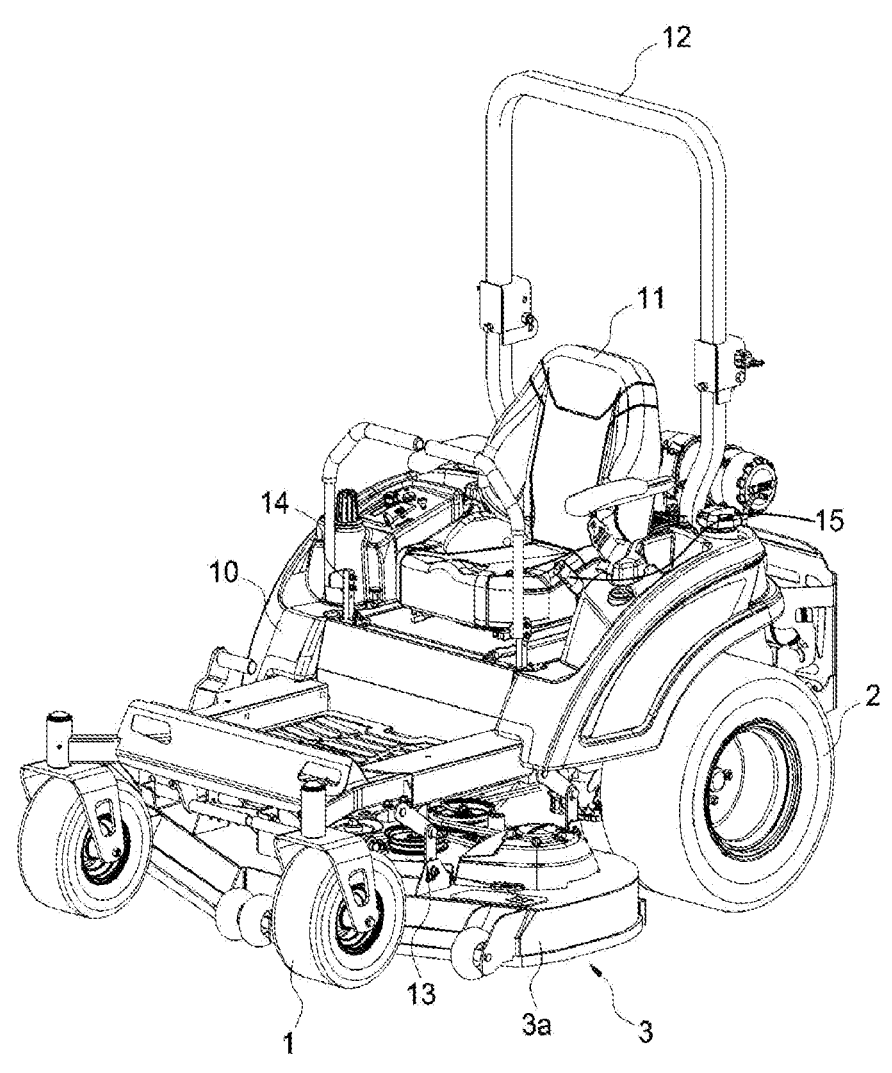
FIG. 1 is a view illustrating a conventional riding-type mowing apparatus.
Figure 2:
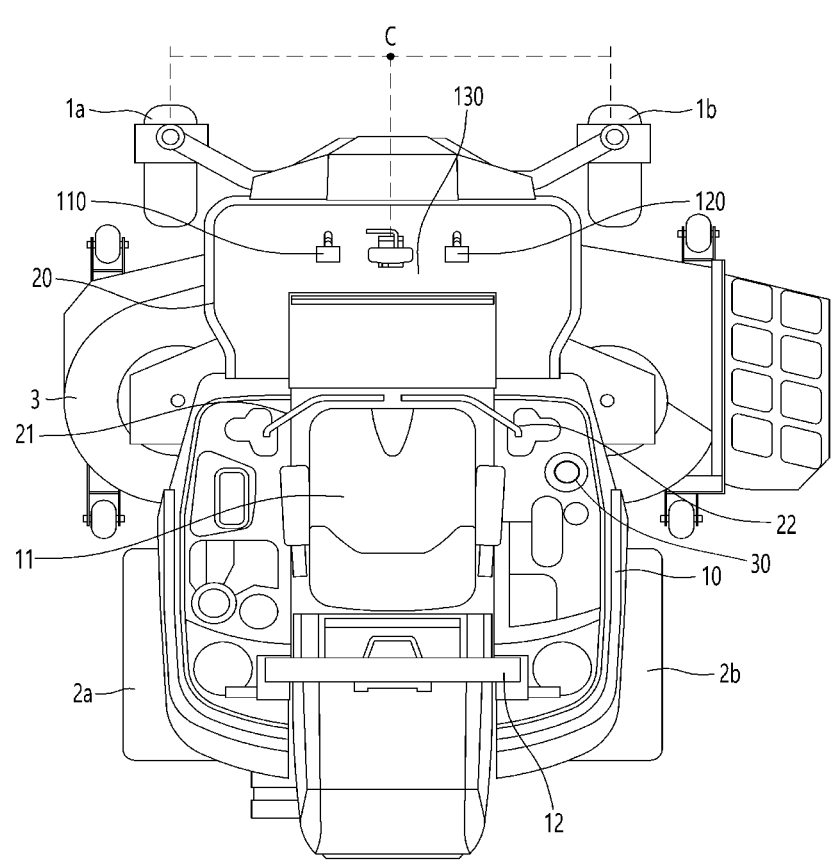
FIG. 2 is a view illustrating an external configuration of the riding-type mowing apparatus according to the present embodiment.

FIG. 2 is a view illustrating an external configuration of the riding-type mowing apparatus according to the present embodiment.

Referring to FIG. 2, the riding-type mowing apparatus according to the embodiment is provided with two front wheels 1a and 1b, two rear wheels 2a and 2b, and a body frame 10 on the front and rear wheels, and the body frame 10 is provided with a chair-type driver seat 11 on which a user may sit and a ROPS 12.

In addition, a first steering lever 21 and a second steering lever 22 are provided at both sides of the driver's seat 11 to manipulate the traveling of the mowing apparatus.

The user may manipulate the first steering lever 21 and the second steering lever 22 to move the mowing apparatus forward and backward and turn the mowing apparatus left and right. For example, when the first steering lever 21 and the second steering lever 22 move forward together, the vehicle may move forward, when the two steering levers are pulled back together, the vehicle may move backward, and when only one steering lever is pushed forward, the vehicle may turn to the left or right.

Further, the apparatus according to the present embodiment includes a lift-down pedal 110 and a lift-up pedal 120, which are configurations for lifting down and up the mower unit including a deck body equipped with a blade, provided with a bottom frame 20 including a brake pedal 130.

That is, the brake pedal 130 for braking the riding-type mowing apparatus to stop the traveling is provided on the bottom frame 20 formed at a lower height than the driver seat 11, and the bottom frame 20 is provided with the lift-down pedal 110 for lifting down the mower unit 3 away from the body frame 10 toward the ground and the lift-up pedal 120 for lifting up the mower unit 3 close to the body frame 10.

In particular, the lift-down pedal 110 and the lift-up pedal 120 are disposed symmetrical to each other about the brake pedal 130, and the lift-down pedal 110 and the lift-up pedal 120 are configured to have the same distance from the brake pedal 130.

This is because the user sits on the driver seat 11 and is guided to manipulate the lift-down pedal 110 with his/her left foot and to manipulate the lift-up pedal 120 with his/her right foot, so that the manipulation of the brake pedal 130 for stopping the movement of the vehicle and the manipulation of the lift-down and lift-up of the mower unit are facilitated without being confused.

If the user presses down the brake pedal 130 with his/her right foot to stop the traveling of the riding-type mowing apparatus, and then presses down the lift-down pedal 110 with his/her left foot, the user may manipulate the mower unit 3 to be lifted down within a short time after the mower unit 3 is stopped. In addition, after the grass is mowed using the mower unit 3 of the riding-type mowing apparatus, the user may accurately and quickly manipulate the mower unit 3 away from the ground by pressing down the lift-up pedal 120 with his/her right foot while pressing down the brake pedal 130 with his/her left foot.

According to the present embodiment, when a central position of the first front wheel 1a and the second front wheel 1b is defined as C, the brake pedal 130 is located on a virtual line connecting position C and the center of the driver seat 11. The lift-down pedal 110 and the lift-up pedal 120 are disposed slightly ahead of the brake pedal 130, and distance A between the lift-down pedal 110 and the brake pedal 130 is the same as distance B between the lift-up pedal 120 and the brake pedal 130. Each of the lift-down pedal and the lift-up pedal is disposed at a position spaced apart from the brake pedal by the same distance, which guides the user to manipulate the lift-down pedal with his/her left foot and to manipulate the lift-up pedal with his/her right foot. Although the center of the distance between the first wheel and the second wheel is defined as C, the central position of the brake pedal 130 may be regarded as C. In this case, the lift-up pedal 120 and the lift-down pedal 110 are formed at positions spaced apart from the brake pedal 130 by the same distance, that is, at positions symmetrical to each other about the brake pedal 130, respectively.

Through this arrangement of the pedals (brake pedal, lift-down pedal, and lift-up pedal), the user is less confused about the position of the pedal and may manipulate the pedals more easily.

Further, the apparatus according to the present embodiment includes a lower limit adjustment lever 30 capable of easily adjusting a lower limit height of the mower unit 3 by the user who sits on the driver seat 11. A lower limit adjustment part is referred to as a configuration including a lower limit adjustment gear and the like, which rotate together according to rotation of the lever, below the lower limit adjustment lever 30 so as to adjust a lower limit height of the mower unit 3 with the lower limit adjustment lever and gear.

That is, the lower limit adjustment lever 30 serves to rotate a lower limit adjustment step 320 connected to a lower side thereof, and when the lower limit adjustment step 320 rotates, the lowest height is determined when the mower unit 3 is lifted up. This will be described in more detail with reference to the accompanying drawings.

Figure 3:
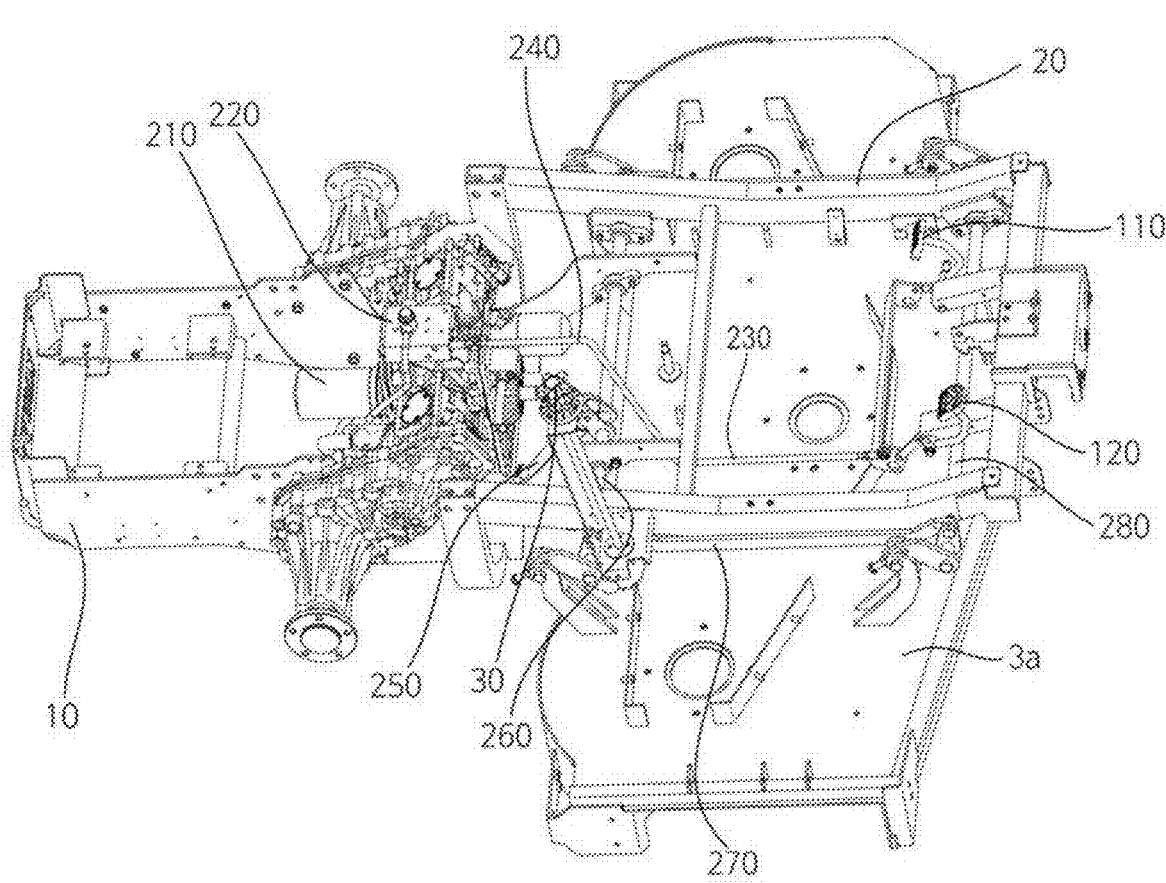
FIG. 3 is a view for explaining a configuration in which a mower unit is lifted down and up in the riding-type mowing apparatus of the present embodiment.

FIG. 3 is a view for explaining a configuration in which a mower unit is lifted down and up in the riding-type mowing apparatus of the present embodiment.

Referring to FIG. 3, the riding-type mowing apparatus according to the embodiment includes: a transmission 210 which is supported by the body frame 10; the bottom frame 20 coupled with the deck body 31 that constitutes the mower unit; the lift-down pedal 110 and the lift-up pedal 120 disposed on the bottom frame 20; a spool connection link 230 which is configured to be pushed rearward where the transmission 210 is present when the lift-down pedal 110 is pressed down as the spool connection link 230 is connected to the lift-down pedal 110 and the lift-up pedal 120, and which is configured to be pulled forward when the lift-up pedal 120 is pressed down; a valve spool 240 which is connected to the spool connection link 230 to allow the spool connection link 230 to move forward or to be pushed backward; a valve 220 in which hydraulic pressure is changed according to movement of the valve spool 240; a hydraulic cylinder 250 connected to the valve 220, in which a length of the hydraulic cylinder 250 is varied according to the hydraulic pressure controlled by the valve; a rear lift shaft 260 which is connected to the hydraulic cylinder 250 to rotate clockwise or counterclockwise according to an extension or contraction of the hydraulic cylinder 250; a lift shaft connection link 270 which is connected to the rear lift shaft 260 to move forward or rearward according to rotation of the rear lift shaft 260; a front lift shaft 280 which is connected to the lift shaft connection link 270 to rotate clockwise or counterclockwise by the lift shaft connection link 270; and the mower unit which is connected to the front lift shaft 280 and the rear lift shaft 260 and is equipped with a blade that is lifted up or lifted down according to rotation of the lift shafts.

Regarding the operation of this configuration, when the user presses down the lift-down pedal 110, the spool connection link 230 is pushed rearward due to the pressing down of the lift-down pedal 110, and the valve spool 240 is also pushed rearward due to the rearward movement of the spool connection link 230.

The hydraulic pressure of the hydraulic cylinder 250 connected to the valve 220 is released by the rearward movement of the valve spool 240, and accordingly, a force applied to lift up the mower unit, which is lifted up by a force of the hydraulic pressure, is released, thereby naturally lifting down the mower unit due to the weight of the mower unit itself. In this case, a lift-down height of the mower unit, that is, a lower limit is determined by the lower limit adjustment part.

In contrast, when the user presses down the lift-up pedal 120, the spool connection link 230 connected to the lift-up pedal 120 is pulled forward, and thus the valve spool 240 is also pulled forward.

In this case, the hydraulic cylinder 250 expands due to the increase of the hydraulic pressure in the valve 220, the rear lift shaft 260 is pushed up by the expansion of the hydraulic cylinder 250. In this case, the front lift shaft 280 also rotates clockwise by the lift shaft connection links 270 provided on both sides of the bottom frame.

That is, as the rear lift shaft 260 and the front lift shaft 280 rotate in the same direction, the connected mower unit is lifted up.

As described above, the rising-type mowing apparatus according to the present embodiment is configured such that the user may easily manipulate the lift-down pedal with his/her left foot and the lift-up pedal with his/her right foot, the lift-down pedal and the lift-up pedal are spaced apart from the center of the driver seat, from the center of the both front wheels, or from the center of the bottom frame by the same distance, so that it is less likely that the user is confused and erroneously manipulate the lift-up and lift-down pedals.

Figure 4:
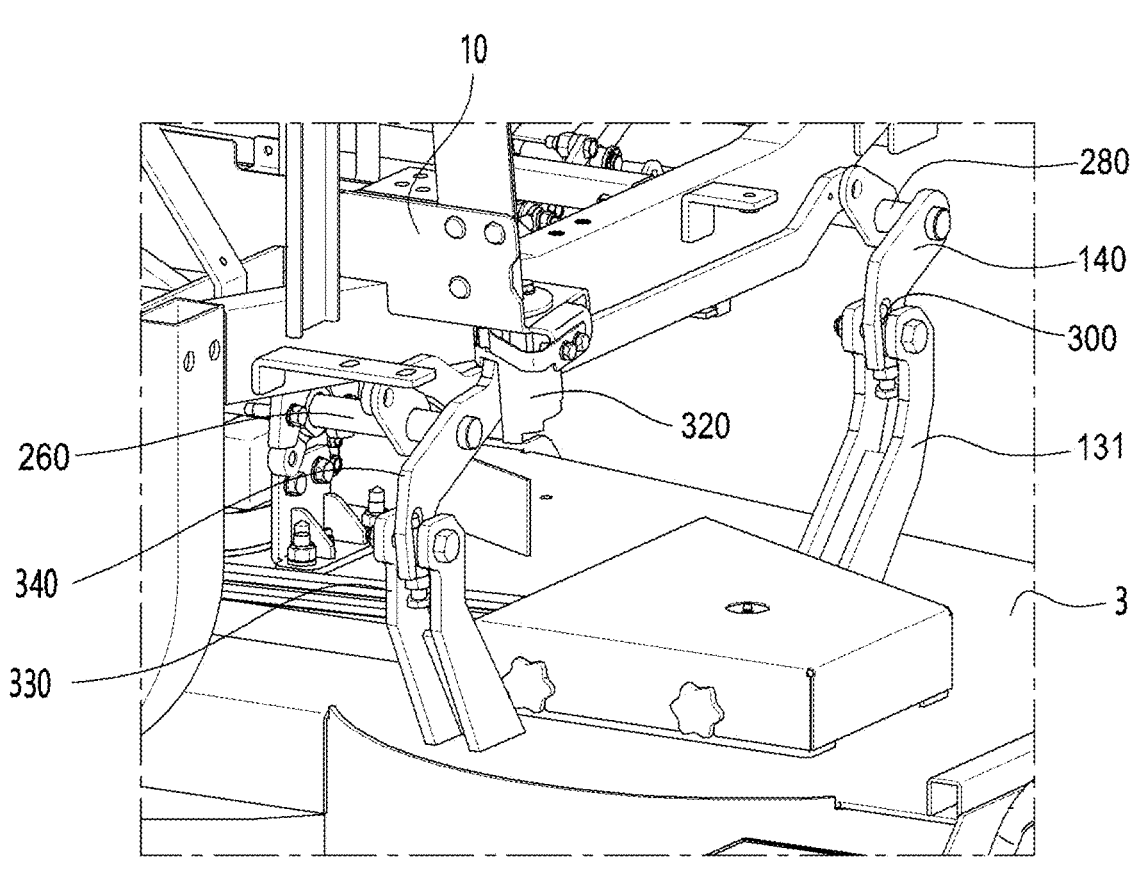
FIG. 4 is a view illustrating a configuration of a deck link for lifting up and down a mower unit of the mowing apparatus according to the present embodiment.

FIG. 4 is a view illustrating a configuration of a deck link for lifting up and down the mower unit of the mowing apparatus according to the present embodiment.

First, referring to FIG. 4, the mowing apparatus has a deck unit 3 mounted below a body frame 10, in which the deck unit 3 is provided with at least one blade having a sharp surface for mowing grass.

The deck unit 3 is coupled to the body frame 10 through a plurality of deck links, and the deck links are coupled to front and rear sides of the deck unit 3, so that it is possible to lift up or down only the front side or the rear side of the deck unit 3 or it is possible to lift up both the front and rear sides of the deck unit 3.

According to the embodiment, the deck link includes a front deck link coupling the front side of the deck unit 3 to the body frame 10 and a rear deck link coupling the rear side of the deck unit 3 to the body frame 10.

The front deck link includes a first front deck link 131 coupled to an upper surface of the deck unit 3 and a second front deck link 140 coupled to the first front deck link 131 and the body frame 10, and the rear deck link also includes a first rear deck link 330 and a second rear deck link 340. A protruding latch part 341 is formed on an upper surface of the second rear deck link 340 to have a shape protruding at a predetermined thickness and to latch a part of the lower limit adjustment step 320, and configurations of the protruding latch part 341 and the lower limit adjustment step 320 will be described in more detail with reference to FIG. 5.

In addition, the front and rear rotary shafts 280 and 260 are coupled to the second front deck link 140 and the second rear deck link 340 to pass therethrough, respectively, and it is determined whether the front or rear side of the deck unit 3 is lifted up or down according to a direction in which the front rotary shaft 280 and the rear rotary shaft 260 rotate.

The front rotary shaft 280 and the rear rotary shaft 260 extend in left and right directions of a vehicle, respectively, so that two second front deck links and two second rear deck links are coupled to the front rotary shaft 280 and the rear rotary shaft 260, respectively.

When the front rotary shaft 280 (or the rear rotary shaft 260) rotates, the second front deck link 140 also rotates, and the height of the first front deck link 131 are lifted up or down according to a rotation direction of the second front deck link 140. That is, since the first front deck link 131 is connected to the second front deck link 140 by the link arm coupling bolt 300, when the second front deck link 140 rotates counterclockwise, the first front deck link 131 is lifted up.

The second rear deck link 340 rotates due to a rotation of the rear rotary shaft 260, and the first rear deck link 330, which is connected under the second rear deck link 340 by the link arm coupling bolt, is lifted up or down.

In this case, the lower limit adjustment step 320 for limiting a rotation range/rotation angle of the second rear deck link 340 is disposed at a position adjacent to the second rear deck link 340, and the lower limit adjustment step 320 rotates by the user, so that a portion/position of the lower limit adjustment step making contact with the second rear deck link 340 is changed.

Figure 5:
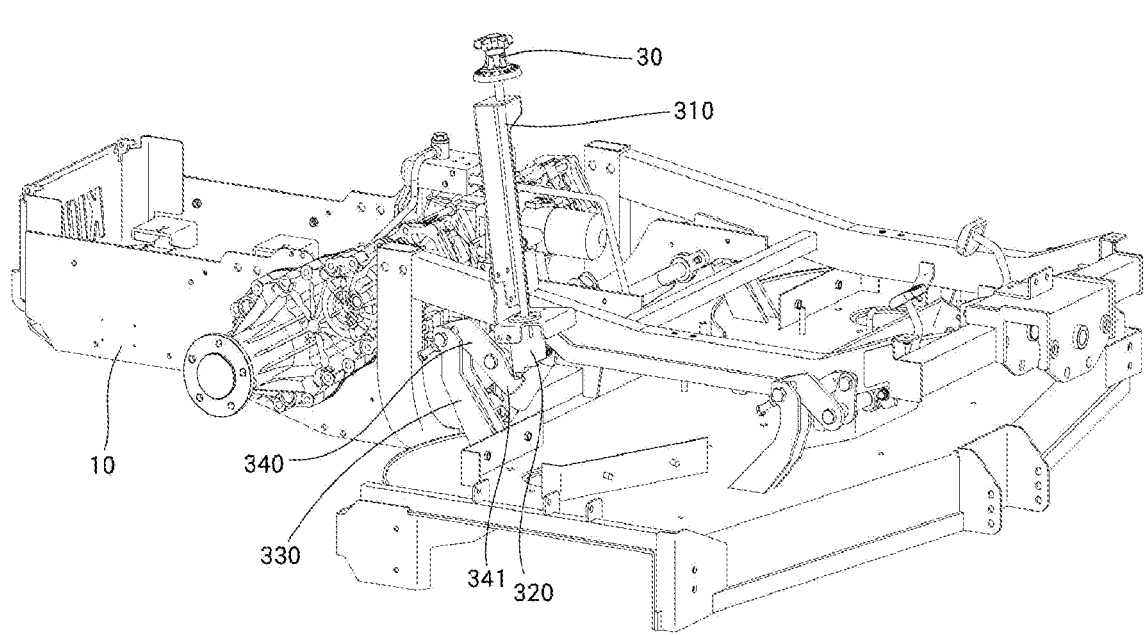
FIGS. 5 and 6 are views for explaining in detail a configuration of a lower limit adjustment part of the mowing apparatus according to the present embodiment.
Figure 6:
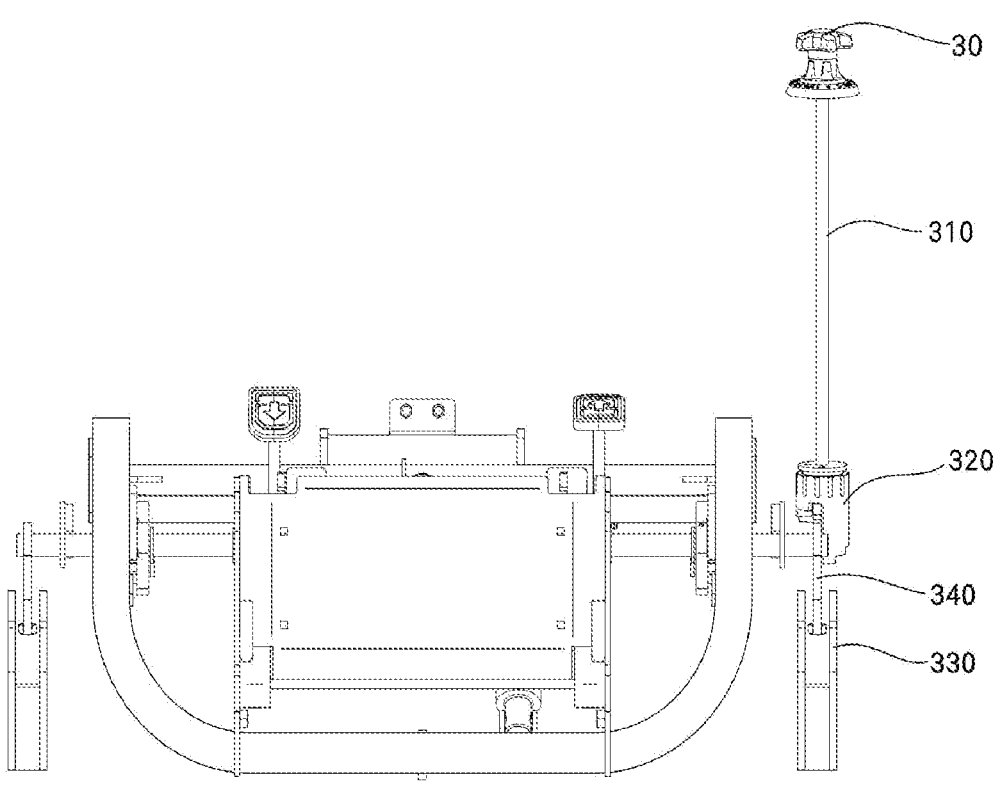

FIGS. 5 and 6 are views for explaining in detail a configuration of the lower limit adjustment part of the mowing apparatus according to the present embodiment. In addition, FIG. 7 is a view illustrating the protruding latch part formed at an end portion of the second rear deck link according to the present embodiment.

Figure 7:
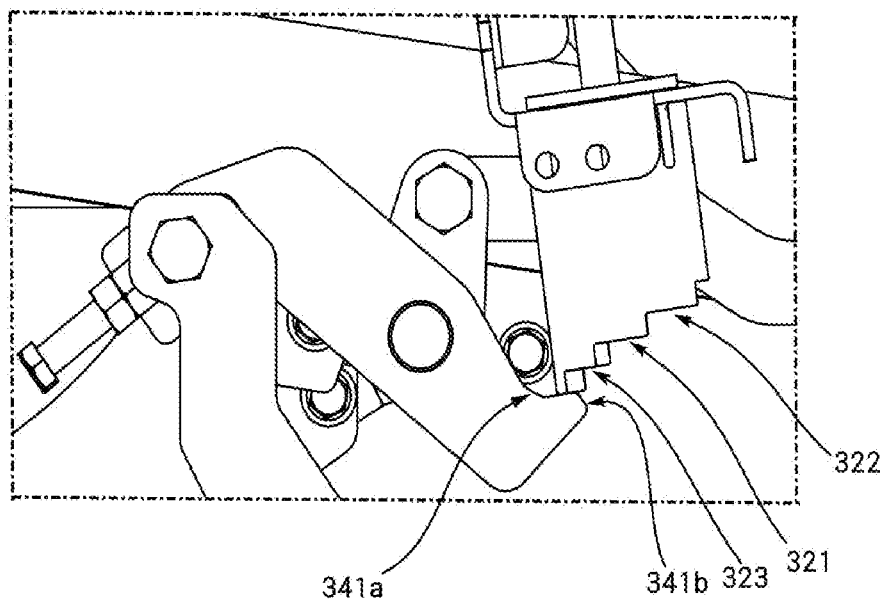
FIG. 7 is a view illustrating a protruding latch part formed at an end portion of a second rear deck link according to the present embodiment.

Referring to FIGS. 5 to 7, the lower limit adjustment lever 30 is installed at a position where the user may grip the lower limit adjustment lever 30 by extending one arm when sitting on the driver seat, and a linear-shaped lever connection bar 310 is formed under the lower limit adjustment lever 30.

The lower limit adjustment step 320 configured to rotate together with the lever connection bar is coupled to a lower end of the lever connection bar 310. In particular, according to the present embodiment, the lever 30, the lever connection bar 310, and the lower limit adjustment step 320 are configured such that the centers thereof are disposed on a straight line, and as the user rotates the lever 30, the lever connection bar 310 and the lower limit adjustment step 320 directly rotate together, so that the lower limit adjustment step 320 directly rotates without intervening other components.

When the lever connection bar 310 and the lower limit adjustment step 320 are not disposed on a straight line, but the lower limit adjustment step 320 rotates by intervening other components, malfunction may occur when the lower limit adjustment step 320 rotates through the lever operation, and a failure or wear may occur due to the intervening of other components.

However, according to the present embodiment, the centers of the lever 30, the lever connection bar 310, and the lower limit adjustment step 320 are disposed in a straight line, so that it is possible to secure consistent operation performance according to the manipulation. Since the lower limit adjustment step 320 is formed in a cylindrical shape, the center of the lower limit adjustment step may also be regarded as a circular center.

When the mower unit 3 is lifted down toward the ground, the protruding latch part 341, which is an end portion of the second rear deck link 340, makes contact with the lower limit adjustment step 320, and when the mower unit 3 is lifted up away from the ground, the protruding latch part 341, which is an end portion of the second rear deck link 340, does not make contact with the lower limit adjustment step 320.

That is, when the mower unit 3 is lifted up, a position of the end portion of the second rear deck link 340 (protruding latch part) is lowered in a direction in which an angle between the first rear deck link 330 and the second rear deck link 340 is decreased, whereas when the mower unit 3 is lifted down, the position of the end portion of the second rear deck link 340 (protruding latch part) is raised in a direction in which the angle between the first rear deck link 330 and the second rear deck link 340 is increased, and thus the protruding latch part 341 makes contact with the lower limit adjustment step 320.

In this case, if the user may change a position of the lower limit adjustment step 320 making contact with the protruding latch part 341, which is the end portion of the second rear deck link 340, it is possible to adjust a height of the position where the protruding latch part 341 makes contact with the lower limit adjustment step 320.

To this end, the lower limit adjustment step 320 has a plurality of stepped portions with mutually different heights, and as the user manipulates the lower limit adjustment lever 30 to rotate the lower limit adjustment step 320, it is possible to adjust the position making contact with the protruding latch part 341, which is the end portion of the second rear deck link 340. That is, the rotation angle at which the second rear deck link 340 rotates counterclockwise may be adjusted, so that the user may determine a degree of lift-down when the mower unit 3 is lifted down toward the ground.

The protruding latch part 341, which is a portion formed on the upper surface of the second rear deck link 340, includes a latch groove 341a having a predetermined depth and a latch protrusion 341b protruding at a predetermined height, and as any one of stepped portions formed on a lower surface of the lower limit adjustment step 320 is seated on the latch groove 341a, the latch protrusion 341b makes close contact with the corresponding stepped portion.

The lower limit adjustment step 320 has a cylindrical shape, is formed on the lower surface thereof with a plurality of steps, and includes a first stepped portion 321 that allows the lower limit height of the mower unit 3 to be set to a first height when the protruding latch part 341 makes contact with the first stepped portion 321, a second stepped portion 322 that allows the lower limit height of the mower unit 3 to be set to a second height lower than the first height, and a third stepped portion 323 that allows the lower limit height of the mower unit 3 to be set to a third height higher than the first height.

That is, when the protruding latch part 341 makes contact with the third stepped portion 323, the mower unit 3 is lifted down and the rotation angle at which the second rear deck link 340 rotates counterclockwise is decreased, so that the degree of lift-down of the mower unit 3 is reduced, resulting in an increase of the lower limit height of the mower unit 3.

Further, when the protruding latch part 341 makes contact with the second stepped portion 322, the mower unit 3 is lifted down, so that the rotation angle at which the second rear deck link 340 rotates counterclockwise is further increased, resulting in a decrease of the lower limit height of the mower unit 3.

In other words, when the protruding latch part 341 makes contact with a stepped portion, which is formed at a position higher than that of the ground, among the plurality of stepped portions formed at an edge of the lower surface of the lower limit adjustment step 320, the lower limit height of the mower unit 3 is set to be closer to the ground, resulting in a decrease of the lower limit height of the mower unit 3. In the description of the present invention and the description of the present invention to be described below, the lower limit height of the mower unit will be described based on the ground.

Meanwhile, when the protruding latch part 341 makes contact with a stepped portion, which is formed at a position closer to the ground, among the plurality of stepped portions formed at the edge of the lower surface of the lower limit adjustment step 320, the lower limit height of the mower unit 3 is set to be farther away from the ground, resulting in an increase of lower limit height of the mower unit 3.

FIGS. 8 to 11 are views illustrating a change in a lower limit height of the mower unit by the lower limit adjustment part in the mowing apparatus according to the present embodiment.

Figure 8:
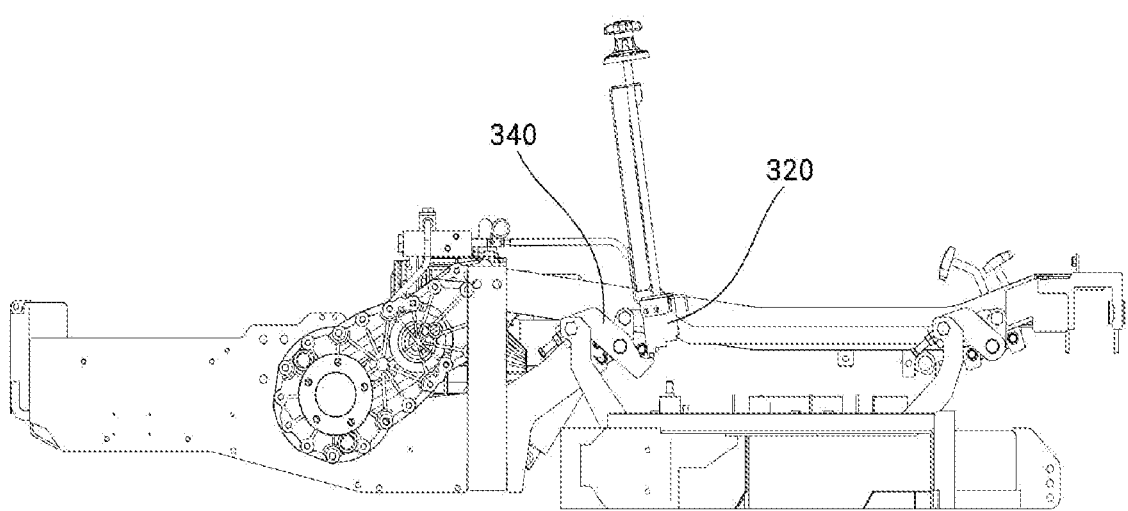
FIGS. 8 to 11 are views illustrating a change in a lower limit height of the mower unit by the lower limit adjustment part in the mowing apparatus according to the present embodiment.
Figure 9:
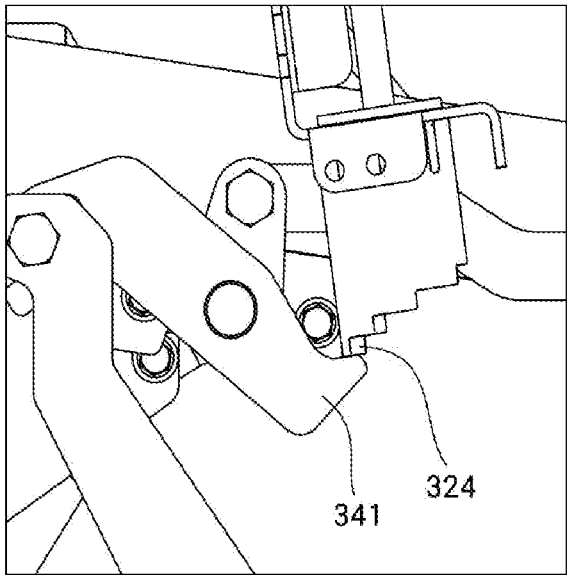

FIGS. 8 and 9 illustrate a state in which the protruding latch part 341 of the second rear deck link 340 makes contact with a maximum lower limit protrusion part 324 that protrudes to be closest to the ground of the lower surface of the lower limit adjustment step 320 so as to have a highest lower limit height among lower limit heights of the mower unit.

That is, as described above, the lower surface of the lower limit adjustment step 320 has a curved shape, and each of the curved surfaces may be referred to as a protrusion part. In this case, among the protrusion parts, a protrusion part having a long protrusion length closest to the ground may make a small rotation radius of the second rear deck link 340 of the mower unit, so that the mower unit is lifted down at a short distance.

Figure 10:
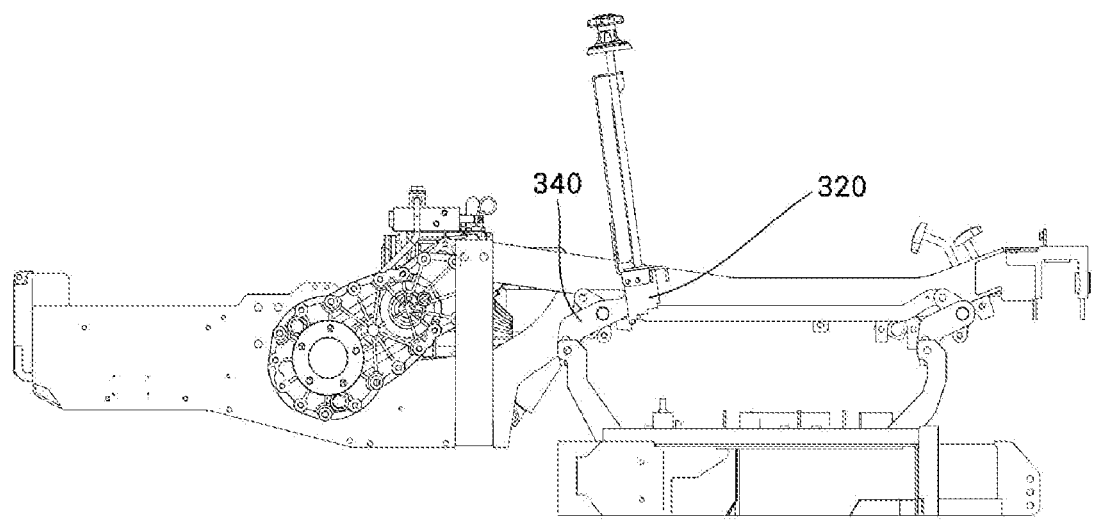
Figure 11:
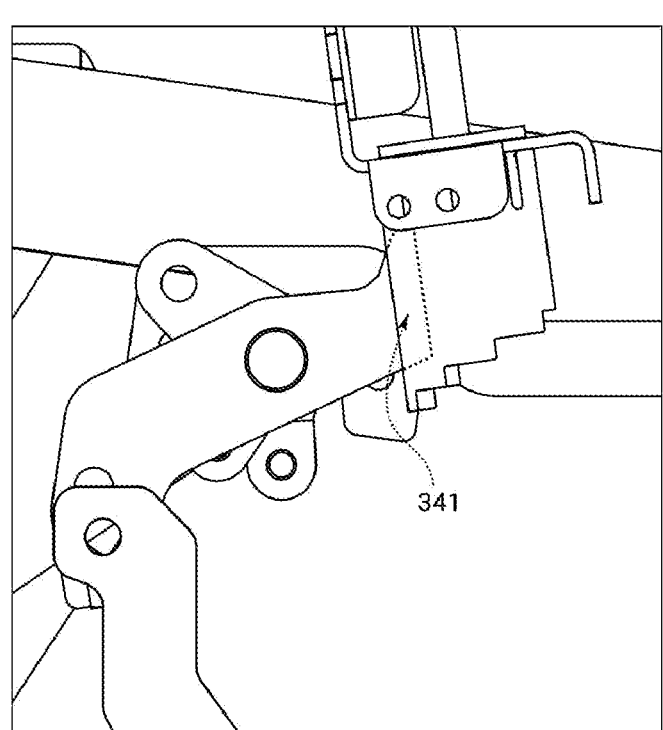

Meanwhile, FIGS. 10 and 11 illustrate a state in which the protruding latch part 341 of the second rear deck link 340 makes contact with a minimum lower limit protrusion part having a lowest lower limit height of the limit heights of the mower unit, among the protrusion parts on the lower surface of the lower limit adjustment step 320. The lever is operated to rotate the lower limit adjustment step 320 so that the corresponding protrusion part is located at a position making contact with the protruding latch part 341.

When the protruding latch part 341 makes contact with a protrusion part, which is located farthest away from the ground among the protrusion parts on the lower surface of the lower limit adjustment step 320, since the rotation radius of the second rear deck link 340 is the largest when the mower unit is lifted down, the mower unit is lifted down at the longest distance, so that a lower limit height closest to the ground is formed.

What is claimed is:

1. A riding-type mowing apparatus having a height adjustment part of a mower unit, in which the mower unit is disposed below a body frame to mow grass through a blade mounted in the mower unit and a driver seat is provided on the body frame, the riding-type mowing apparatus comprising:
   a lower limit adjustment lever provided at a position in which a user sitting in the driver seat is able to reach the position by extending an arm of the user;
   a lever connection bar coupled to a lower portion of the lower limit adjustment lever and extending in a linear shape;
   a lower limit adjustment step configured to rotate together with the lever connection bar and to adjust a lift-down height of the mower unit using the lower limit adjustment lever when the mower unit is lifted down toward a ground;
   a brake pedal provided on a bottom frame disposed in front of the body frame to brake the riding-type mowing apparatus; and a lift-down pedal and a lift-up pedal disposed on both sides of the brake pedal to lift-down and lift-up the mower unit, respectively, to lift down and up the mower unit, wherein the lift-down pedal and the lift-up pedal are disposed at positions symmetrical to each other about the brake pedal, wherein the lower limit adjustment step has a cylindrical shape, and wherein a lower surface of the lower limit adjustment step is formed with a plurality of stepped portions having different distances from the ground;

a first front deck link coupled to a front upper surface of the mower unit; a second front deck link coupled to the first front deck link and the body frame;

a first rear deck link coupled to a rear upper surface of the mower unit; a second rear deck link coupled to the first rear deck link and the body frame; and a protruding latch part formed at an end portion side of the second rear deck link to have a shape protruding upward with a predetermined thickness, and configured to make contact with a lower surface of the lower limit adjustment step when the mower unit is lifted down, wherein the protruding latch part is a portion formed on an upper surface of the second rear deck link, and includes a latch groove having a predetermined depth and a latch protrusion protruding at a predetermined height, and wherein the protruding latch part does not make contact with the lower surface of the lower limit adjustment step when the mower unit is lifted up away from the ground.

2. The riding-type mowing apparatus of claim 1, wherein the lower limit adjustment lever, the lever connection bar, and the lower limit adjustment step are configured such that centers thereof are located on a straight line.

3. The mowing apparatus of claim 1, wherein the stepped portion includes a first stepped portion that allows a lower limit height of the mower unit to be set to a first height when the protruding latch part makes contact with the first stepped portion, a second stepped portion that allows the lower limit height of the mower unit to be set to a second height lower than the first height, and a third stepped portion that allows the lower limit height of the mower unit to be set to a third height higher than the first height, and wherein the second stepped portion is formed to be closer to the ground compared to the first stepped portion.

4. The mowing apparatus of claim 3, wherein any one of the stepped portions formed on the lower surface of the lower limit adjustment step is seated on the latch groove, and the latch protrusion makes close contact with the corresponding stepped portion.

* * * * *